United States Patent [19]

Yoshida

[11] Patent Number: 4,700,399
[45] Date of Patent: Oct. 13, 1987

[54] COLOR IMAGE PROCESSING APPARATUS

[75] Inventor: Tadashi Yoshida, Ichikawa, Japan

[73] Assignee: Canon Kabushiki Kaisha, Tokyo, Japan

[21] Appl. No.: 741,545

[22] Filed: Jun. 5, 1985

[30] Foreign Application Priority Data

Jun. 14, 1984 [JP] Japan ................................ 59-120794

[51] Int. Cl.<sup>4</sup> .............................................. G06K 9/46
[52] U.S. Cl. ........................................ 382/17; 358/79; 358/80
[58] Field of Search ...................... 382/17, 22, 50, 52, 382/53; 358/282, 78, 80, 79

[56] References Cited

U.S. PATENT DOCUMENTS

| | | | |
|---|---|---|---|
| 4,479,242 | 11/1984 | Kurata | 382/17 |
| 4,482,917 | 11/1984 | Gaulke et al. | 358/80 |
| 4,501,016 | 2/1985 | Persoon et al. | 382/22 |
| 4,583,116 | 4/1986 | Hennig et al. | 358/80 |
| 4,590,515 | 5/1986 | Wellendorf | 358/80 |
| 4,642,681 | 2/1987 | Ikeda | 358/79 |

FOREIGN PATENT DOCUMENTS

1096376 12/1967 United Kingdom .
2057219  3/1981 United Kingdom .
2134352  8/1984 United Kingdom .

Primary Examiner—David K. Moore
Assistant Examiner—Jacqueline Todd
Attorney, Agent, or Firm—Fitzpatrick, Cella, Harper & Scinto

[57] ABSTRACT

A color image processing apparatus comprises a detector for detecting an edge of an image and a control unit for controlling a black reproduction quantity for the edge in accordance with an output of the detector.

10 Claims, 13 Drawing Figures

| COMPARATOR 16 | COMPARATOR 17 | COMPARATOR 18 | OUTPUT OF ENCODER 19 | |
|---|---|---|---|---|
| 0 | 0 | 0 | 0 | 0 |
| 1 | 0 | 0 | 0 | 1 |
| 1 | 1 | 0 | 1 | 0 |
| 1 | 1 | 1 | 1 | 1 |

Fig. 4

| $i-1, j-1$ | $i, j-1$ | $i+1, j-1$ |
|---|---|---|
| $i-1, j$ | $i, j$ | $i+1, j$ |
| $i-1, j+1$ | $i, j+1$ | $i+1, j+1$ |

COLOR IMAGE PROCESSING APPARATUS

BACKGROUND OF THE INVENTION

1. Field of the Invention

The present invention relates to a color image processing apparatus for reproducing a color image.

2. Description of the Prior Art

In a prior art color image processing apparatus of this type, when a color image is to be read and reproduced, a text image is read by a scanner which decomposes it to red, green and blue component color images which are primary colors in an additive coloring system. Then, the component color images are processed by complementary color conversion, masking or undercolor removal to produce color image data of yellow, mazenta, cyan and black which are three primary colors in a substractive coloring system. The color image data are combined to produce the color image.

The color processing is performed prior to the combination of the color image data because inks of the respective component colors used to reproduce the color image, for example, yellow, magenta and cyan ink have spectrum reflection factor characteristics which are different from ideal ones.

In the undercolor removal processing, undercolors of equal amount which form black are removed from the yellow, mazenta and cyan image data, and the black quantity (or black component) is calculated to obtain image data corresponding to a black. The processing is necessary to precisely reproduce gray which is hardly reproduced precisely by the three colors, yellow, mazenta and cyan. It is important in a printing technique that the same amount of inks are used in changing the three primary color inks into the black ink.

In the undercolor removal processing, a minimum density of the yellow, mazenta and cyan color component densities is set to 100% and undercolors of equal amount less than the minimum density are removed from the respective color component densities and the undercolors of the equal amount less than the minimum density represent the black quantity. The amount of undercolor removal in a normal color image processing is less than 50% of the minimum density, and a shadow area is reproduced by the black quantity calculated by the undercolor removal and the black formed by mixing the three remaining primary colors. If all of the minimum density (100%) were used as the black quantity in a highlight area would appear too dark. In the prior art color image processing apparatus which reproduces the shadow area by the black produced by the undercolor removal processing and the black produced by the combination of the three colors, a full color image such as a color photograph which is colorful and includes gray areas can be reproduced by multi-color printing without any serious problems. However, when a color image text which includes the full color image and a monochromatic binary image such as black characters, or a detail area including fine lines drawn on a shadow area is to be read and reproduced, a problem is encountered. Since the black in the character or detail area is reproduced by superposition of the three colors and the black produced by the undercolor removal processing, the color becomes muddy and the edges of the characters or the detail areas become dim.

The black reproduction by the superposition of colors raises a problem of color offset. In an ink jet recording system which has recently been used as a color image recording system or a high speed recording system such as an electrophotographic system or thermal transfer recording system, the color offset by the superposition of colors raises a problem. When a text image which includes black characters in a half-tone color image is to be read and reproduced, the color offset of yellow, mazenta, cyan and black at the edges of the black characters is remarkable and the color of the characters becomes muddy or dim.

SUMMARY OF THE INVENTION

It is an object of the present invention to improve a color image processing apparatus.

It is another object of the present invention to provide a color image processing apparatus having a high reproduceability for an edge of an image.

It is another object of the present invention to provide a color image processing apparatus having a reduced color offset.

It is another object of the present invention to provide a color image processing apparatus which clearly reproduces a black image in a shadow area or a character in a color image with a reduced color offset.

It is another object of the present invention to provide a color image processing apparatus which clearly reproduces a detail area in a shadow area or a black character in a color image by increasing a proportion of black produced by undercolor removal processing.

DETAILED DESCRIPTION OF THE PREFERRED EMBODIMENTS

Figure 1:
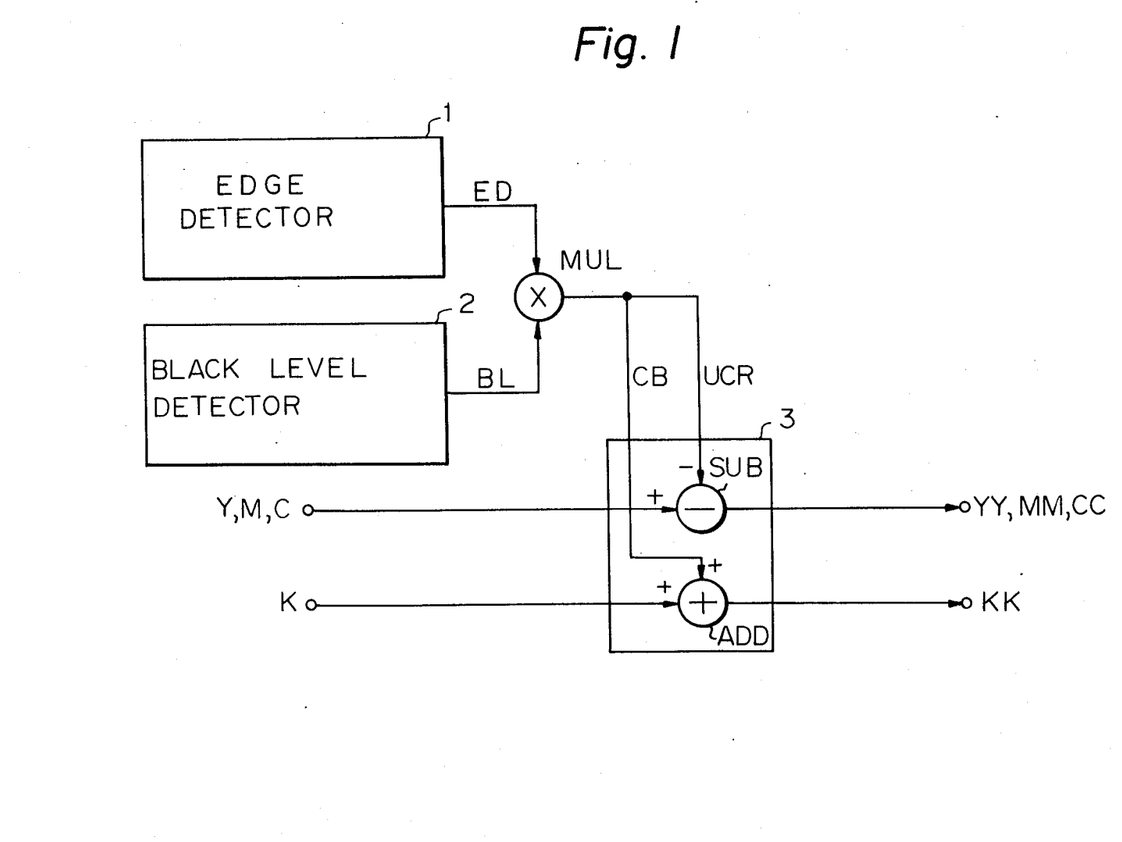
FIG. 1 is a block diagram showing a basic configuration of one embodiment of a color image processing apparatus of the present invention.

FIG. 1 shows a basic configuration of one embodiment of the color image processing apparatus of the present invention. An edge detector 1 detects an edge quantity ED which represents a change in density at an edge of an image, and a black level detector 2 detects a black level BL of the image. The edge quantity ED and black level BL are supplied to a multiplier MUL which calculates undercolor removal quantity UCR and a black quantity (or a black component) CB which are proportional to the product of ED and BL. The UCR and CB are supplied to a subtractor SUB and an adder ADD, respectively. Yellow, mazenta and cyan densities Y, M and C are supplied to the subtractor SUB, which calculates three primary color densities YY, MM and CC by subtracting the undercolor removal quantity UCR from the respective densities Y, M and C. A black density K is supplied to the adder ADD, which produces a black density KK by adding the black quantity CB to the black density K. In this manner, variable undercolor removal is effected in accordance with the edge quantity of the image and the black level.

The principle of operation of the present embodiment can be readily understood by considering a black character in a half-tone full color image. A change of density at the edge of the black character is larger than that in other half-tone areas and a larger edge quantity is detected by the edge detector. Because of the black character, a black density K which corresponds to a minimum one of the yellow, mazenta and cyan densities Y, M and C is large. Accordingly, at the edge of the black character, the undercolor removal quantity UCR is large and the black character image having a larger UCR than other half-tone areas is reproduced so that the black character in the half-tone full color image is clearly reproduced. If the black quantity CB is larger than UCR, the edge of the black character is further emphasized. This principle of operation can be equally applied to the shadow area in the half-tone full color image.

Figure 2:
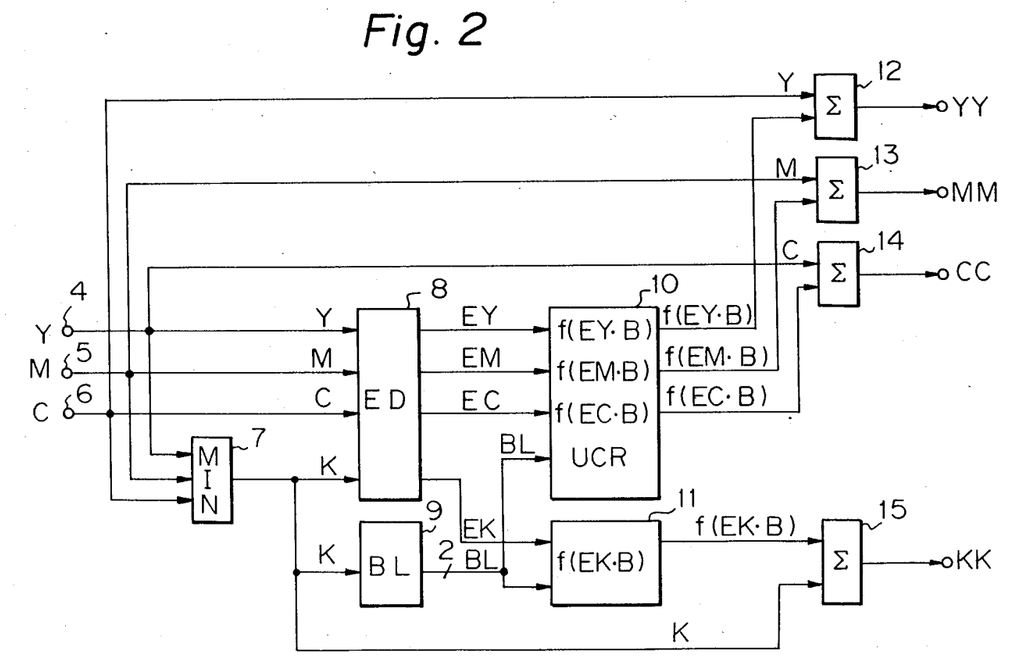
FIG. 2 is a block diagram of a detailed configuration of the embodiment.

FIG. 2 shows a detailed configuration of the color image processing apparatus of the present invention. Signal waveforms thereof will be explained later with reference to FIGS. 5A–5G.

In FIG. 2, a digital color image density signal is decomposed to yellow, mazenta and cyan color density signals Y, M and C, which are applied to input terminals 4, 5 and 6 and supplied to a minimum detector 7, an edge detector 8 and adders 12, 13 and 14 for the respective colors. The minimum detector 7 detects a minimum one of the digital color signals Y, M and C as a color signal black density K=Min {Y, M, C} which is supplied to the edge detector 8 and a black level detector 9. The black level detector calculates a black density level BL which is proportional to the color signal black density K.

Figure 3A:
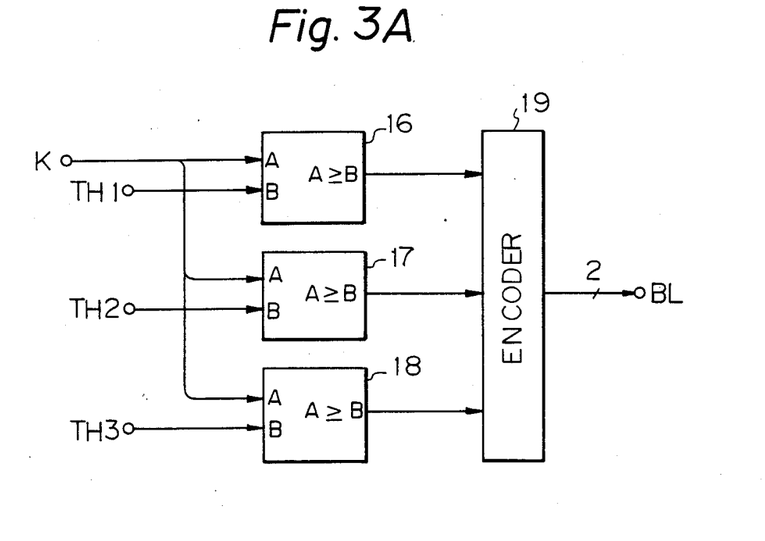
FIGS. 3A and 3B are block diagram and characteristic curves of a black level detector and a reference threshold.
Figure 3B:
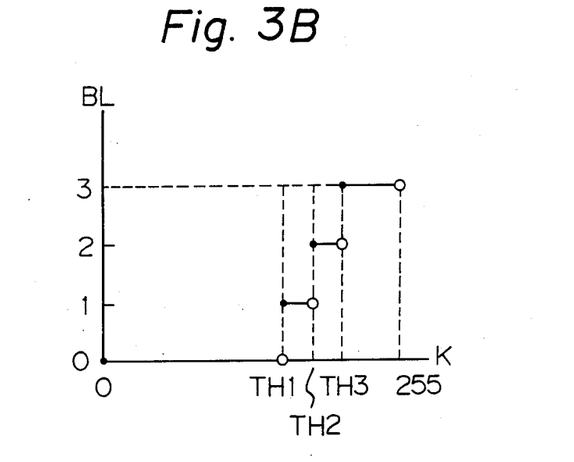

The black density level BL is set to this level in order to effectively reduce color image information quantity. FIGS. 3A and 3B show an example thereof. FIG. 3A shows the black level detector 9. The 8-bit color signal black density K from the minimum detector 7 is supplied to first input terminals A of the comparators 16, 17 and 18, and different reference thresholds TH1, TH2 and TH3 are supplied to second input terminals B for comparison with the color signal black density K.

Figure 3C:
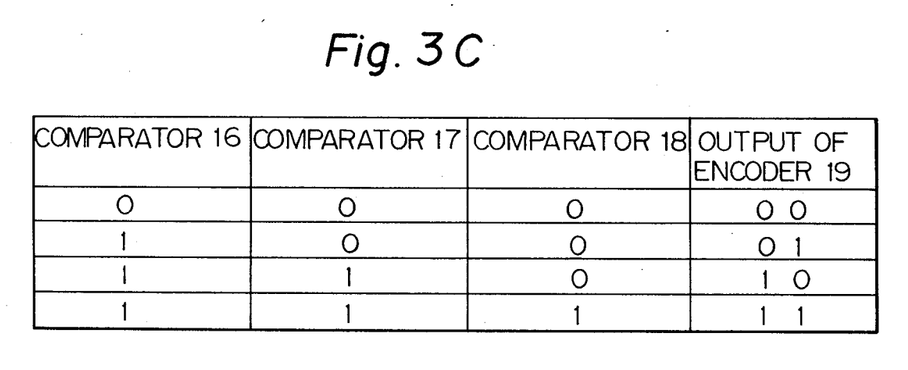
FIG. 3C shows an output data of an encoder 19.

The reference thresholds TH1, TH2 and TH3 are set at unequal pitches as shown in FIG. 3B, and output signals from the comparators 16–18 are encoded by an encoder 19 which produces 2-bit signals as shown in FIGS. 3B and 3C. In this manner, the density levels in the shadow area can be represented with a smaller information quantity.

Figure 4:
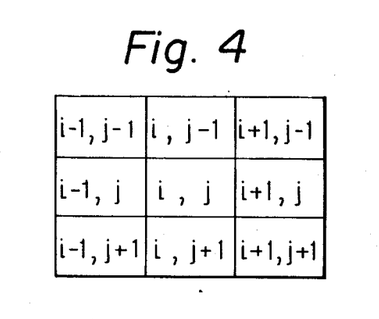
FIG. 4 shows edge detection.

The edge detector 8 detects edges in the color signals Y, M and C by Laplacian. FIG. 4 shows an example of edge detection. In FIG. 4, pixels are shown around a pixel (i, j), and the edge quantity E which is a sum of differences between a density level P(i, j) of the pixel (i, j) and densities of adjacent pixels is obtained in the following manner.

$$E = \sum_{n=j-1}^{j+1} \sum_{m=i-1}^{i+1} \{P(i,j) - P(m,n)\} \qquad (1)$$

where $m \neq i$, $n \neq j$ and P(i, j) is the digital density data.

Figures 5A, 5B, 5C:
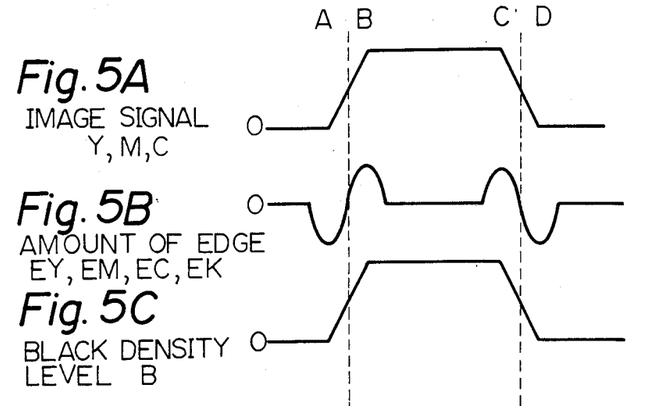
FIGS. 5A to 5G show signal waveforms in the configuration of FIG. 2.

FIGS. 5A–5G show signal waveforms of the edge detector. The waveforms in FIG. 5 are digital signal waveforms. Let us assume that the color signal Y, M or C has edges of the signal waveform as shown in FIG. 5A. The rising edge and the falling edge are divided into two portions, respectively, around the centers thereof.

The front portions and the rear portions are designated by A, B and C, D, respectively. The half-edge portions A, B, C and D are processed in accordance with the formula (1) so that the edge detector 8 produces signal waveforms EY, EM, EC and EK as shown in FIG. 5B. The result of the process to the non-edge area is always zero. Those signals are supplied to function converters 10 and 11 to which the black density level B shown in FIG. 5C from the black level detector 9 is applied. The function converters 10 and 11 produce functions f(EY.B), f(EM.B), f(EC.B) shown in FIG. 5D and f(EK.B) shown in FIG. 5E, using the edge quantity E and the black density level B as parameters. In FIG. 2, the functions for the color signals Y, M and C are proportional to both the edge quantity E and the black density level B for the half edges A and D, and the functions for the half edges B and C are converted to negative signals in proportion to both the edge quantity E and the black density level B. The color signal black density K is converted to a function proportional to both the edge quantity E and the color signal black density K, for the half edges A, B, C and D.

The functions for the respective color signals are supplied to signal addresses 12, 13 and 14 where they are added to the color signals Y, M and C, respectively. The function for the black signal K is supplied to a signal adder 15 where it is added to the black signal K.

$$YY = Y + f(EY.B) \qquad (2)$$

$$MM = M + f(EM.B) \qquad (3)$$

$$CC = C + f(EC.B) \qquad (4)$$

$$KK = K + f(EK.B) \qquad (5)$$

Figures 5D, 5E, 5F:
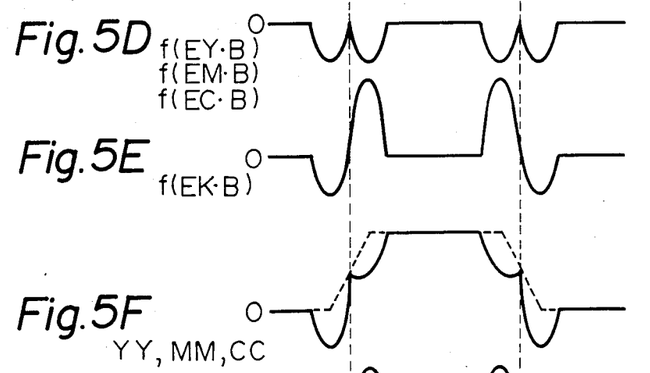
Figure 5G:
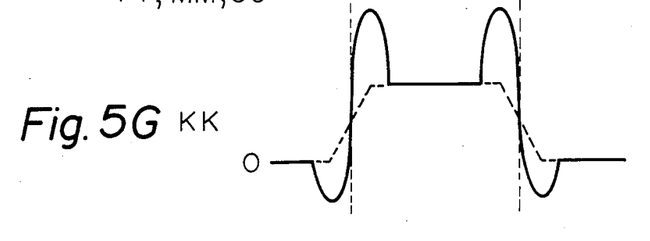

The signals YY, MM, CC and KK shown in FIGS. 5F and 5G represent the edges for the signals Y, M and C. For the edges, the densities of the color signals Y, M and C are reduced in accordance with the edge quantity to increase the black density or the UCR quantity. The signal waveforms shown by broken lines in FIGS. 5F and 5G are that shown in FIG. 5A.

In the color image processing apparatus of the present embodiment, the edge in the shadow area can be emphasized and the degree of edge emphasis can be changed in accordance with the black density level.

In accordance with the present invention, the proportion of the undercolor removed at the edge of the color image is increased and the black quantity is increased to emphasize the edge so that the black character in the half-tone color image or the detail area in the shadow area can be clearly reproduced without mud.

The present invention is not restricted to the illustrated embodiment but various modifications may be made within the scope of the appended claims.

What is claimed is:

1. A color image processing apparatus comprising:
    generating means for generating a color signal having a plurality of color component signals,
    black signal detecting means for detecting a black signal from the color component signals;
    control means adapted to obtain the amount of black reproduction in accordance with the black signal;
    under color removal means for performing under color removal from each color component signal in accordance with the black signal; and edge detection means for detecting an edge of said color image;

wherein said under color removal means controls the amount of under color removal in accordance with the black signal and the output from said edge detection means, and said control means controls the amount of black reproduction in accordance with the black signal and the output from said edge detection means.

2. A color image processing apparatus according to claim 1 wherein said black signal detection means includes minimum detection means for detecting a minimum density of component color densities.

3. A color image processing apparatus according to claim 2 wherein said minimum detection means compares the color component signals with each other.

4. A color image processing apparatus according to claim 1 wherein said edge detection means detects the edge of the color image by using Laplacian.

5. A color image processing apparatus according to claim 1 wherein when both the value of the black signal and the output from said edge detection means are great, said under color removal means increases the amount of under color removal and said control means increases the amount of black reproduction.

6. A color image processing method comprising the steps of:

generating a color signal having a plurality of color component signals;

detecting a black signal from the color component signals;

obtaining the amount of black reproduction in accordance with the black signal;

performing under color removal from each color component signal in accordance with the black signal; and detecting an edge of said color image;

wherein in said performing step, the amount of under color removal is performed in accordance with the black signal and the output from said edge detecting step; and in said obtaining step, the amount of black reproduction is obtained in accordance with the black signal and the output from said edge detecting step.

7. A color image processing method according to claim 6 wherein said edge detection step detects the edge of the color image by using Laplacian.

8. A color image processing method according to claim 6 wherein said detecting step includes a minimum detection step for detecting a minimum density of the component color signals.

9. A color image processing method according to claim 8 wherein said minimum step compares the component signals with each other.

10. A color image processing method according to claim 6 wherein when both the value of the black signal and the output from said edge detecting step are great, the amount of under color removal is increased in said performing step and the amount of black reproduction is increased in said obtaining step.

* * * * *

UNITED STATES PATENT AND TRADEMARK OFFICE
CERTIFICATE OF CORRECTION

PATENT NO. : 4,700,399

DATED : October 13, 1987

INVENTOR(S) : TADASHI YOSHIDA

Page 1 of 2

It is certified that error appears in the above-identified patent and that said Letters Patent is hereby corrected as shown below:

COLUMN 1

Line 16, "mazenta," should read --magenta,--.
Line 17, "substrac-" should read --subtrac---.
Line 24, "spectram" should read --spectrum--.
Line 28, "mazenta" should read --magenta--.
Line 33, "mazenta" should read --magenta--.
Line 37, "mazenta" should read --magenta--.

COLUMN 2

Line 7, "mazenta," should read --magenta,--.
Line 16, "reproduceability" should read --reproducibility--.
Line 57, "subtractor SUB" should read --subtracter SUB--.
Line 58, "mazenta" should read --magenta--.
Line 59, "subtractor SUB," --subtracter SUB,--.

COLUMN 3

Line 8, "mazenta" should read --magenta--.
Line 23, "mazenta" should read --magenta--.

UNITED STATES PATENT AND TRADEMARK OFFICE
CERTIFICATE OF CORRECTION

PATENT NO. : 4,700,399
DATED : October 13, 1987
INVENTOR(S) : TADASHI YOSHIDA

It is certified that error appears in the above-identified patent and that said Letters Patent is hereby corrected as shown below:

<u>COLUMN 4</u>

Line 61, "signals," should read --signals;--.

Signed and Sealed this

Twenty-ninth Day of November, 1988

Attest:

DONALD J. QUIGG

*Attesting Officer*     *Commissioner of Patents and Trademarks*